(12) United States Patent
Perry

(10) Patent No.: US 7,765,033 B2
(45) Date of Patent: Jul. 27, 2010

(54) INTELLIGENT DEVICE CONTROL SYSTEM

(75) Inventor: Tim Perry, St. Louis, MO (US)

(73) Assignee: DSA, Inc., St. Louis, MO (US)

( * ) Notice: Subject to any disclaimer, the term of this patent is extended or adjusted under 35 U.S.C. 154(b) by 253 days.

(21) Appl. No.: 12/144,154

(22) Filed: Jun. 23, 2008

(65) Prior Publication Data

US 2008/0319556 A1 Dec. 25, 2008

Related U.S. Application Data

(60) Provisional application No. 60/945,797, filed on Jun. 22, 2007.

(51) Int. Cl.
*G05B 11/01* (2006.01)
*G05B 13/00* (2006.01)
*G01N 33/48* (2006.01)
*G06F 7/04* (2006.01)

(52) U.S. Cl. ............... 700/275; 700/14; 700/17; 702/19; 726/21

(58) Field of Classification Search ............ 700/14, 700/17, 83, 275–278, 282–284; 701/19, 701/131; 726/2, 16, 17, 21, 26, 27, 28
See application file for complete search history.

(56) References Cited

U.S. PATENT DOCUMENTS

| | | | |
|---|---|---|---|
| 4,344,071 A | 8/1982 | Allen | |
| 4,408,308 A | 10/1983 | Smith et al. | |
| 4,476,554 A | 10/1984 | Smith et al. | |
| H891 H | 2/1991 | Hashimoto | |
| 5,493,618 A | 2/1996 | Stevens et al. | |
| 5,656,995 A | 8/1997 | Wayne | |
| 5,701,117 A | 12/1997 | Platner et al. | |
| 5,861,806 A | 1/1999 | Vories et al. | |
| 5,905,442 A | 5/1999 | Mosebrook et al. | |
| 6,122,678 A | 9/2000 | Eckel et al. | |
| 6,188,986 B1 | 2/2001 | Matulich et al. | |
| 6,275,163 B1 | 8/2001 | Bogorad et al. | |
| 6,324,514 B2 | 11/2001 | Matulich et al. | |
| 6,388,399 B1 | 5/2002 | Eckel et al. | |
| 6,594,630 B1 | 7/2003 | Zlokarnik et al. | |
| 6,760,454 B1 | 7/2004 | Shreve et al. | |

(Continued)

OTHER PUBLICATIONS

International Search Report and Written Opinion, PCT/US2008/067880, dated Feb. 20, 2009, 10 pages.

*Primary Examiner*—Sean P Shechtman
(74) *Attorney, Agent, or Firm*—Senniger Powers LLP

(57) ABSTRACT

A device for controlling devices in a monitored space. A sensor senses an event in an initial state indicating an occupant may be present in the monitored space. A switch activates the controlled device in response to the sensed event. A processor enables the device to change from the initial state to a first state in response to the sensed event, with the first state indicating that the occupant may be in the monitored space. The device also changes from the first state to a second state while determining whether the occupant continues to be in the monitored space in response to a query challenge. The device next changes from the second state to the initial state in response to the determining indicating that the occupant is not in the monitored space. The switch deactivates the controlled device in the initial state in the monitored space.

35 Claims, 6 Drawing Sheets

U.S. PATENT DOCUMENTS

| | | |
|---|---|---|
| 6,909,921 B1 | 6/2005 | Bilger |
| 2003/0092297 A1 | 5/2003 | Reindle et al. |
| 2005/0253538 A1 | 11/2005 | Shah et al. |
| 2006/0009863 A1 | 1/2006 | Lingemann |
| 2006/0071605 A1 | 4/2006 | Diederiks |
| 2006/0076908 A1 | 4/2006 | Morgan et al. |

PRIOR ART

INTELLIGENT DEVICE CONTROL SYSTEM

BACKGROUND

Currently available devices (referred to as Occupancy Sensors, Motion Sensors, Automatic Wall Switch, or the like) are typically designed to replace traditional ceiling light wall switches or switches for other apparatuses. For example, these devices (as exemplified by a schematics shown in FIG. 1) include a lighting controller and a motion sensor that senses the presence of an occupant or a subject within a space to be illuminated by the controlled light. These traditional devices turn on a controlled light immediately upon detecting motion within a monitored space and will subsequently turn off the controlled light following a preset period of no detected motion.

Examples of such devices include: Leviton® PR180-1LW Decora® Passive Infrared Wall Switch Occupancy Sensor, SensorSwitch Wall Switch Decorator Sensor—Passive Infrared (PIR), Watt Stopper® WS-200 Automatic Wall Switch.

The limitations of some of the existing technologies include the method used to determine when to turn the controlled light off. For example, consider a case when a controlled light is lit in a room and a room occupant is sitting in the room quietly reading or resting. If the magnitude of occupant's movements is insufficient to be detected by the motion sensor, the lighting controller will turn off the controlled light following a preset or pre-determined delay built-into the lighting controller. In this situation, the occupant will be left in a darkened room unintentionally.

At least another example of unintentional consequences is an application of the existing technology in a public restroom. An occupant in a toilet stall could get caught in a darkened restroom if s/he remains in the restroom too long, and the occupant may not have any means to turn the lights back on. To use the device under the current technology presents a safety hazard in certain situations, and not using such a device overlooks the energy saving benefits offered by such device.

Furthermore, current technologies that only rely on the preset or pre-determined time delay (without detecting any motion) before turning off the device lacks flexibility unintentionally wasting energy use. For example, suppose the time delay is set to 30 minutes. If a subject approaches the monitored space just enough to trigger the device but immediately moves away from the monitored space, the current technology would unintentionally leave the device on for the full duration of the time delay even though there is no need for the device to be activated or energized.

SUMMARY

Embodiments of the invention enhance various shortfalls of existing technologies by using a set of querying sequences or mechanisms and a state machine to efficiently and correctly control devices. Information from the state machine may be further provided to other systems. For example, alternative embodiments of the invention may further form a virtual intelligent device controller system for monitoring and controlling one or more devices in one or more monitored spaces. Alternative embodiments of the invention further provide information about the presence or absence of a subject in a monitored space. In a further alternative embodiment, aspects of the invention incorporate a doorway traversal sensor to further accurately indicate whether a subject is in a monitored space, such as a room. Information provided from the doorway traversal may further be provided or displayed to a third party who monitors the information.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

Figure 1:
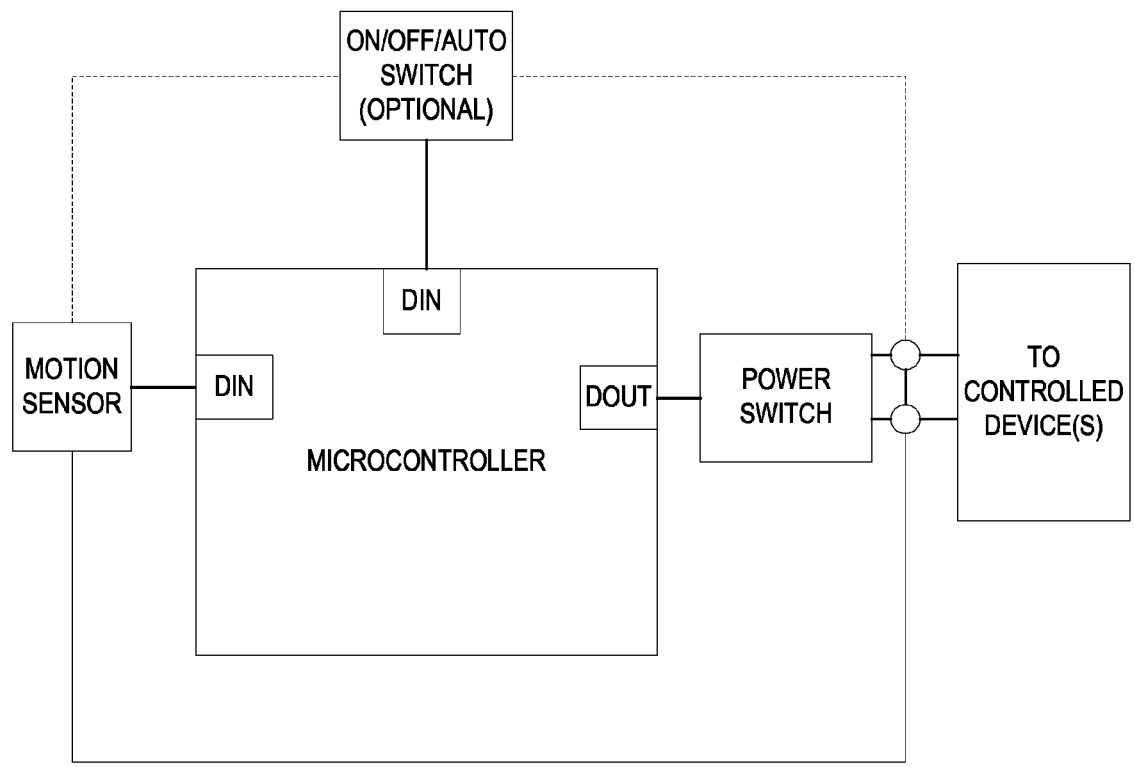
FIG. 1 illustrates a diagram of schematics of a typical prior technology.

Table 1 illustrates a list of exemplary terms used in describing embodiments of the invention.

Appendix A includes source codes for implementing an exemplary embodiment of the IDC Finite State Machine according to an embodiment of the invention.

Corresponding reference characters indicate corresponding parts throughout the drawings.

DETAILED DESCRIPTION

Table 1 below includes one or more terms to further describe one embodiment of the invention. These terms may include defining statements, conclusory statements, examples, and/or parameters that are applicable to one embodiment and do not limit the scope of this or other embodiments of the invention.

TABLE 1

| | |
|---|---|
| controlled light | The light that illuminates the monitored space and that is controlled by an intelligent device controller (IDC). |
| control noise | Noise generated by the room occupant with the intent of effecting a desired action by the IDC. |
| delay before query | Time in seconds to wait following the most recently observed movement within the monitored space and the initiation of a query sequence. This value is used to initialize the interval timer. A common value for Delay Before query is 300 representing 5 minutes. |

TABLE 1-continued

| | |
|---|---|
| Detected Motion | Motion detected by motion sensor(s) (and the IDC connected to these sensors) within the monitored space. |
| Doorway Traversal | The act of someone passing through a doorway that separates the monitored space and adjoining space outside the monitored space. The IDC can sense that a doorway traversal has occurred but cannot directly sense whether the direction of traversal was into or out of the monitored space. |
| Doorway Traversal Sensor | A sensor, external to or part of the IDC, which transmits a signal to the IDC upon detecting a doorway traversal. Example sensors include 1) a switch which activates when the associated door is opened and 2) a beam sensor such as products made by Instronics ® Inc. or Diell ®. |
| Intelligent Device Controller (IDC) | The new enhanced/intelligent lighting control technology being introduced in this document. |
| Interval Timer (IT) | A timer within the microcontroller that is reset to its upper value each time motion is detected within the monitored space. The timer is continuously counting down during the time the controlled light is on and it is uncertain that room occupant is within the monitored space. When the MFIT timer counts down to zero the IDC begins the occupant query. |
| Lighting Controller | Either an instance of existing technology or IDC. |
| Max Timer | An IDC timer used to establish a maximum time in the room occupied state. The max timer has four possible states: 1) Active, 2) Expire—the timer has counted down to 0, 3) Disabled. When the timer expires the IDC clears the room occupied flag and initiates a query sequence. |
| Monitored space (MS) | The area which is illuminated by the controlled light and which is (at least partially) monitored by the IDC motion sensor. |
| Noise | Acoustical energy registered by the IDC microphone above a preset threshold value. |
| Noise Initiated Query (NIQ) | A query sequence initiated by a control noise. |
| occupant query (OQ) | An observable action (e.g. blinking the lights) that the IDC initiates to indicate to the room occupant the beginning of the query response period. |
| Query Blink Period | The length of time the controlled light is turned off to blink the controlled light as a form of occupant query. |
| Query Response (QR) | An action (e.g., specific tone, yelling or making some other loud noise) made by the room occupant during the query response period. The purpose of this response is to indicate to the IDC that the room occupant wishes the lights to remain on. |
| Query Response Period (QRP) | The interval of time after initiating an occupant query, the IDC will wait before turning off the lights. If the room occupant responds appropriately (via a query response) to the query, the IDC will allow the light to remain on. If the IDC does not detect an acceptable query response within the query response period then IDC will turn off the light and return to its reset (quiescent) state. |
| Query Sequence | A sequence of events controlled by the IDC for the purpose of determining if there is a room occupant present. A query sequence consists of a occupant query followed by a query response period. A query sequence is initiated upon entry to query occupant state. |
| Query Occupant State | A transitory IDC logic state used to generate the occupant query. The IDC progresses to the wait for acknowledgement state after expiration of the query response period. |
| Room May Be Occupied State | An IDC logic state indicating the IDC has previously detected a room occupant and it is uncertain whether someone is still within the monitored space. |
| Room Occupant (RO) | The person or persons currently within the monitored space. |
| Room Occupied Flag | A "flag" or secondary state information maintained by the IDC to record that the IDC has established there is a room occupant. The flag is set by the IDC whenever the room occupied state is entered, and is cleared whenever the room may be occupied state is entered or when leaving the room occupied state due to (MaxTimer == 0). |
| Room Occupied State | An IDC logic state that indicates the controlled light is currently on because the IDC unambiguously determined a room occupant is present. This determination can be made by the IDC in any of several ways. The simplest determination is made by the IDC initiating a query sequence.<br>Since this state is only entered by an explicit action taken by the room occupant, the IDC unambiguously knows |

TABLE 1-continued

| | |
|---|---|
| | there is someone in the room when in this state. The IDC remains in this state as long as the room occupant is known to be in the room. |
| Room Unoccupied State | An IDC logic state indicating that the IDC believes that no one is within the monitored space. |
| Specific Tone | Any of several acoustic signals, initiated by the room occupant to be interpreted as a control noise by the IDC. These noises are chosen such that they are unlikely to occur in nature. For example, a tone at a specific frequency and for a duration exceeding a preset minimum time. |
| Virtual IDC | The combination of the logic within an automation system and geographically dispersed sensors that together provide the same functionality as an IDC that would be located within the monitored space. In this way, a single automation system can implement multiple Virtual IDC's. |
| Wait For Acknowledgment State (WFAS) | An IDC logic state that indicates that a Query Sequence is in progress. That is, upon entry into the WAFS the IDC generates the occupant query and waits for the query response. |

Mainly for illustration purposes only and not by limitations, embodiments of the invention are illustrated using switches to manage energy use of controlled devices in a monitored space, such as lights, illuminating objects, motion sensors, noise sensors, or the like in a room. In another embodiment, aspects of the invention may be implemented in other monitored space, such as an entry or exit near a garage or parking lot with a gate that controls a gate (i.e., controlled device) permitting the entry into and exit out of the garage or parking lot. It is to be understood that embodiments of the invention may be applied to other switches or devices without departing from the scope of the invention. In a further embodiment, aspects of the invention may be used in security or fire safety industries in which information provided by embodiments of the invention may be used to clearly indicate the presence or absence of a subject in a monitored space.

One embodiment of the invention uses an Intelligent Device Controller (IDC) to implement aspects of the invention. In another embodiment, aspects of the invention may be implemented as a virtual IDC as described in FIG. 5. As such, for simplicity and without limitations, the use of the term "IDC" throughout this document may also mean the term virtual IDC.

Figure 2:
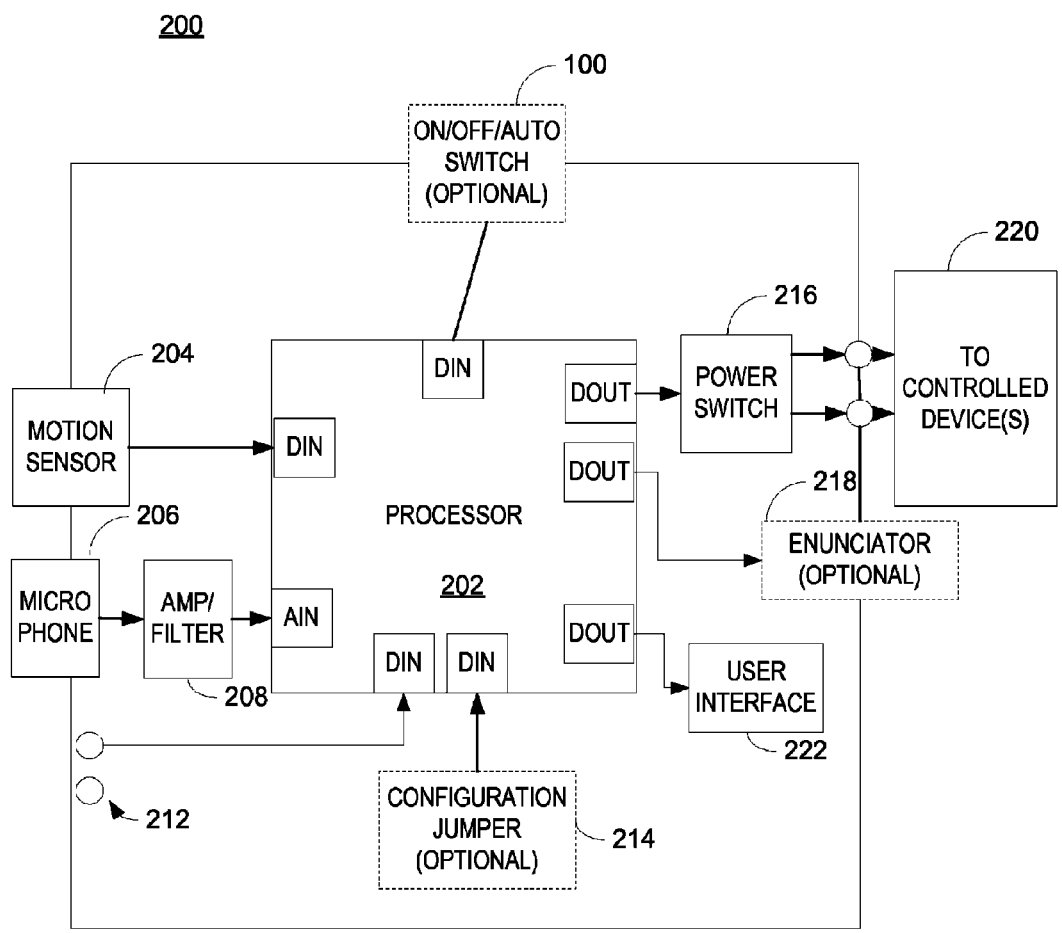
FIG. 2 is a diagram illustrating schematics of a basic embodiment of a controller according to an embodiment of the invention.

Referring now to FIG. 2, a diagram illustrating schematics of a basic embodiment of a controller 200 according to an embodiment of the invention. The controller 200 includes a processor 202, which may be a microcontroller, microprocessor, a processor, or a plurality of processors. In one embodiment, the processor 202 may be a computing device, a server device, or a cluster of server devices. The controller 200 also receives inputs from input devices, such as a motion sensor 204, or a microphone 206 (with an optional amplifier/filter 208). In one embodiment, the controller 200 includes an input such as a passageway traversal sensor 212.

Figure 3:
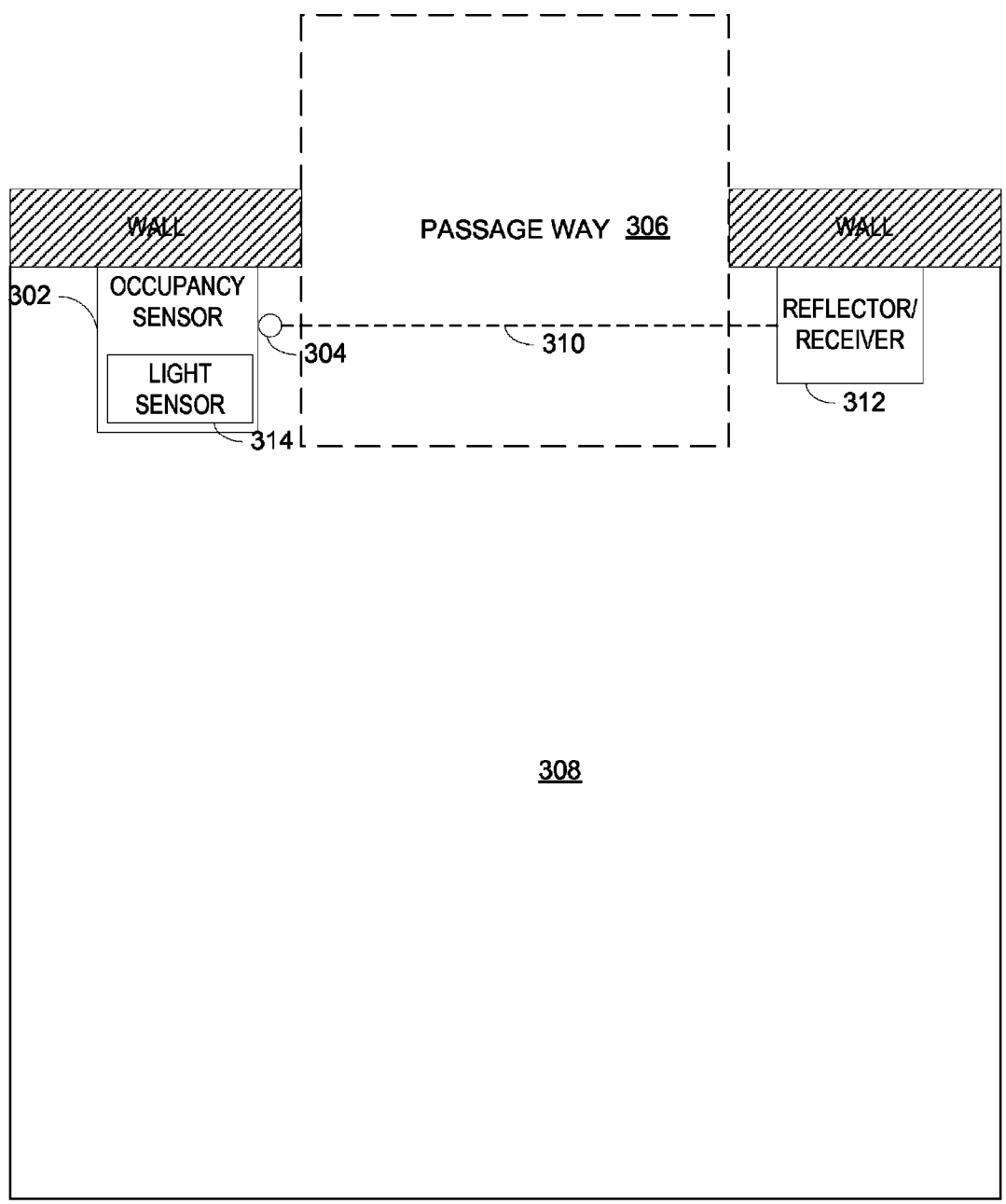
FIG. 3 is a diagram illustrating an embodiment of a passageway traversal sensor according to an embodiment of the invention.

In one embodiment, the passageway traversal sensor 212 may be implemented, as illustrated in FIG. 3, by an occupancy sensor 302 installing a side directed light source 304 near an entrance (e.g., passageway 306) to a monitored space 308 which transmits a light beam 310 across the passageway 306. On the opposite side of the passageway 306 can be either an active receiver or a reflector 312. The active receiver 312 detects the light beam 310 and sends an electronic signal (either wired or wireless) back to the occupancy sensor 302 transmitting the light 310. In one embodiment when the passive reflector 312 is used, the occupancy sensor 302 transmits a light beam 310 across the passageway 306, the light 310 is reflected off the reflector back to a light sensor 314 that is part of the occupancy sensor. As such, when a subject is in the passageway 306 or crosses the passageway 306, the light beam 310 is broken and the occupancy sensor 302 can thus be aware of the subject traversing the passageway 306.

Still referring to FIG. 2, the controller 200 receives input signals from an optional configuration jumper 214. For example, the configuration jumper 214 includes configuration for noise initiated query, a noise sensitive initial turn on setting, and a passageway traversal sensor connected setting. It is to be understood that other settings may be included in the configuration jumper 214.

The processor 202 processes the inputs from some of the input devices (e.g., a motion sensor 204) according to a plurality of states to be described below. The processor 202 next produces output signals to a power switch 216 or an enunciator 218 before passing or transmitting the signals to a controlled device 220. In one example, the controlled device 220 may be a light or an illuminating object. In an alternative embodiment, the processor 202 provides outputs to a user interface 222 to be displayed or provided to a user.

Figure 4:
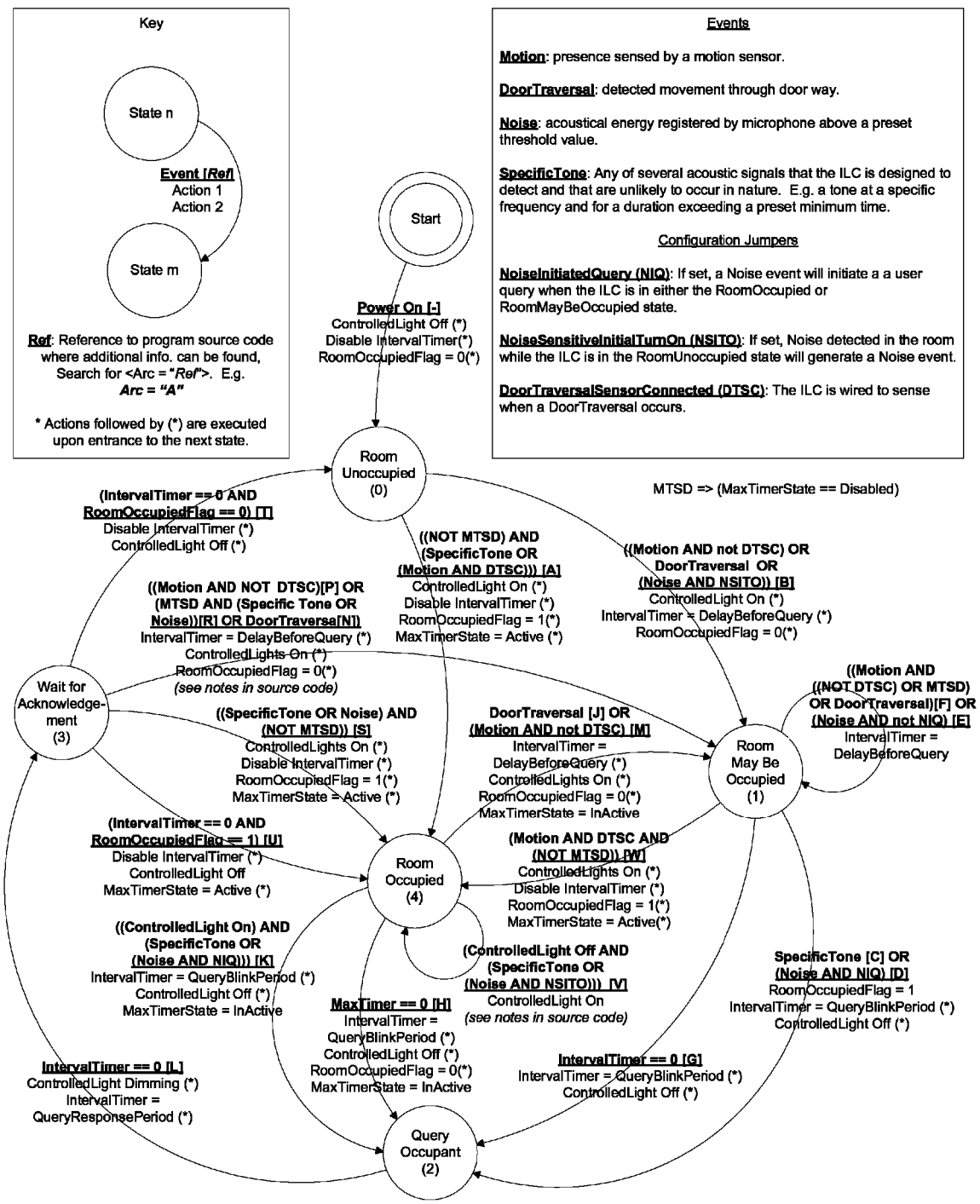
FIG. 4 is a block diagram illustrating a state diagram of a controller according to an embodiment of the invention.

Referring now to FIG. 4, a block diagram illustrates a state diagram on FIG. 2 of an embodiment of the invention. FIG. 4 is described in reference to the monitored space 308 being a room and the subject being a room occupant. It is to be understood that other types of monitored space and other types of sensors may be used without departing from the scope and spirit of embodiments of the invention. While in the room occupied state, the IDC will know that a room occupant is present and will not initiate any query sequence. Once in the room occupied state, the question becomes "how does the controlled light subsequently get turned off?" It is desirable that the controlled light be turned off when the last room occupant leaves the monitored space. In order for a room occupant to leave, s/he must move to the doorway or an exit leading out of the monitored space. This movement is detected by the IDC via its motion sensor. When the IDC is in the room occupied state and motion is detected, the IDC transitions to the room may be occupied state. At this point, in this embodiment, it is no longer known with probable certainty that there is still someone in the monitored space. This detected motion could have been the result of any of several actions including: a) another person has entered the monitored space, b) a room occupant has merely moved within the space but not left it, c) one room occupant has left the space but others still remain, or d) the last room occupant has left the space and the monitored space is now empty. This ambiguity is the same as when someone first enters the monitored space. Upon entry to the room may be occupied state, the IDC follows the procedures outlined above. For example, a) begin a delay period, b) upon any detected motion reset the delay period, c) upon expiration of the delay period initiate an occupant query sequence by transitioning to the query occupant state.

Observations to make about the IDC's actions may include:

1. In one embodiment, a room occupant should never get caught in the dark, because the IDC will warn the room occupant of the pending decision by the IDC to turn off the controlled light. The room occupant then has the opportunity to prevent or stop the pending action (i.e. the controlled light turned off) via a query response.

2. In another embodiment, the IDC only "listens" or monitors for a query response during the short query response period and is thus insensitive to environmental noises at other times.

3. In a further embodiment, if there is an environmental noise during the query response period the consequence will be that the controlled light will be left on unnecessarily. There is no opportunity for a room occupant to be left in the dark.

4. Once the IDC is in the room occupied state, it may be unnecessary for the IDC to generate another query sequence unless or until motion is detected within the monitored space. This is true because the room occupant cannot leave the monitored space without moving (while the motion sensor is working/functioning properly). In this way, according to a further embodiment of the invention, the IDC is prevented from generating repeated query sequences and thereby annoying the room occupant with unnecessary queries.

As described above, at least one of the steps may form a sequence and such sequence of steps whose execution is contingent of specified observations.

In the following sequence, lines preceded by paragraph numbers are state labels.

Start (Power off) State
1-1 Wait for Power On
1-2 GoTo 1-3 [Arc="–"]
Room Unoccupied State (0)
1-3 Disable Interval Timer or event timer
1-4 Turn off the controlled light.
1-5 Wait for Detected Motion
1-6 GoTo 1-7 [Arc="B"]
Room May Be Occupied State (1) (i.e., the subject may be provisionally in the monitored space)
1-7 Turn on the controlled light.
1-8 Set the Interval Timer to the Delay Before Query value.
1-9 Wait for either Detected Motion OR (Interval Timer=0).
1-10 If Detected Motion GoTo 1-8 [Arc="E"]
1-11 Assert(Interval Timer=0)
1-12 GoTo 0 [Arc="G"]
query occupant state (2)
1-13 Set the Interval Timer to the Query Blink Period value.
1-14 Turn off the controlled light or issue query challenge
1-15 Wait for (Interval Timer=0)
1-16 GoTo 7 [Arc="L"]
Wait for Acknowledgement State (3)
1-17 Turn on the controlled light
1-18 Set Interval Timer to query response Period)
1-19 Wait for either Detected Motion OR query response OR (Interval Timer=0).
1-20 If(Detected Motion) then GoTo 1-7 [Arc="P"]
1-21 If (Interval Timer=0) then GoTo 1-3 [Arc="T"]
1-22 Assert(query response)
1-23 GoTo 1-24 [Arc="S"]
Room occupied state (4)
1-24 Disable Interval Timer
1-25 Wait for Detected Motion
1-26 GoTo 1-7 [Arc="M"]

As illustrated in FIG. 4, embodiments of the invention effectively avoid or inhibit the controlled light from staying on when the monitored space is unoccupied yet guards against the controlled light being turned off while there is a room occupant even if he or she not moving in a way that can be detected by the IDC. What if the room occupant wishes to turn off the controlled light? An example scenario would be a person has been lying quietly in bed reading a book and she now wishes to turn out the light and go to sleep. This functionality can be achieved by making the IDC sensitive to Control noise at appropriate times. Logic can be added to the IDC microcontroller to sense a Control noise while in either the room occupied state or the Room May Be Occupied State and upon detecting this Control noise to begin a query sequence by transitioning to the query occupant state. If there is no query response detected within the query response Period the IDC turns off the controlled light and advances to either the room occupied state or Room Unoccupied State depending on whether the IDC knows a room occupant is present. The IDC makes this determination by testing a new internal state variable called the Room Occupied Flag. The Room Occupied Flag is set by the IDC whenever the room occupied state is entered, and is cleared whenever the Room May Be Occupied State is entered. A configuration jumper NoiseInitiatedQuery (NIQ) provides the user the option of enabling or disabling the feature described in this paragraph. It is to be understood that the NIQ (Noise Initiated Query) is not the only way to initiate a query. In one example, a specific tone may initiate a query independent of the value of NIQ. NIQ's purpose includes to disable noise sensitivity in noisy environments. A specific tone is much less susceptible to being misinterpreted as compared to the NIQ.

What if the room occupant is in bed with the lights out (the controlled light was previously turned off via a Noise Initiated Query) and she wishes to have the lights turned on? Up to now, the only way for the controlled light to be turned on has been via Detected Motion. In this embodiment, the IDC logic is modified to make the IDC sensitive to a Control noise while in the room occupied state and to turn on the controlled light when a Control noise is detected. In this case the IDC will remain in the room occupied state after turning the light on. In another embodiment, aspects of the invention may be subject to audio events such as a noise. In one example, noise includes an acoustical energy registered by a microphone above a preset threshold value. In such an example, the IDC may not distinguish between a noise generated by the room occupant with the intent of influencing the IDC's operation and an unintended Noise either generated by the room occupant or due to some other cause.

The likelihood of the JDC misinterpreting a Noise is mitigated by making the IDC sensitive to a specific, controlled Noise referred to herein as a Specific Tone. (The IDC could be sold with a small whistle that generates a specific audio tone which the IDC has been designed to detect.)

With only minor exception, this embodiment may be implemented by starting with an embodiment shown in FIG.

3 having the logic described above and replacing any reference to Noise in the logic with (Noise OR Specific Tone). The exceptions to this are:

1. Upon detection of a Specific Tone while in the Room Unoccupied State, the controlled light is turned on and the IDC transitions to the room occupied state.

2. A Specific Tone does not cause a transition from Room Unoccupied State to Room May Be Occupied State (as Noise does.)

Still referring to FIG. 4, one embodiment may extend the functionality of aspects of the invention with the addition of a Doorway Traversal Sensor input, an optional enunciator, and MaxTimer to optionally limit the maximum time the state machine can stay in the room occupied state. By monitoring ingress/egress to/from the monitored space, the IDC can more accurately determine the presence of a room occupant. In prior embodiments, Detected Motion within the monitored space always created uncertainty about the presence of a room occupant. This is true because any Detected Motion could have been movement out the door at the boundary of the monitored space. With the addition of a Doorway Traversal Sensor, a room occupant will always cause a Doorway Traversal event leaving the monitored space; therefore once the IDC has unambiguously determined that a room occupant is present (i.e. once the Room Occupied Flag is set), the IDC can ignore any further Detected Motion unless or until a Doorway Traversal event.

It is to be understood that, by those skilled in the art, codes, routines, functions or the like written in other computer program languages or computer-executable code implementation syntax may be used without departing from the scope of the invention.

Figure 5:
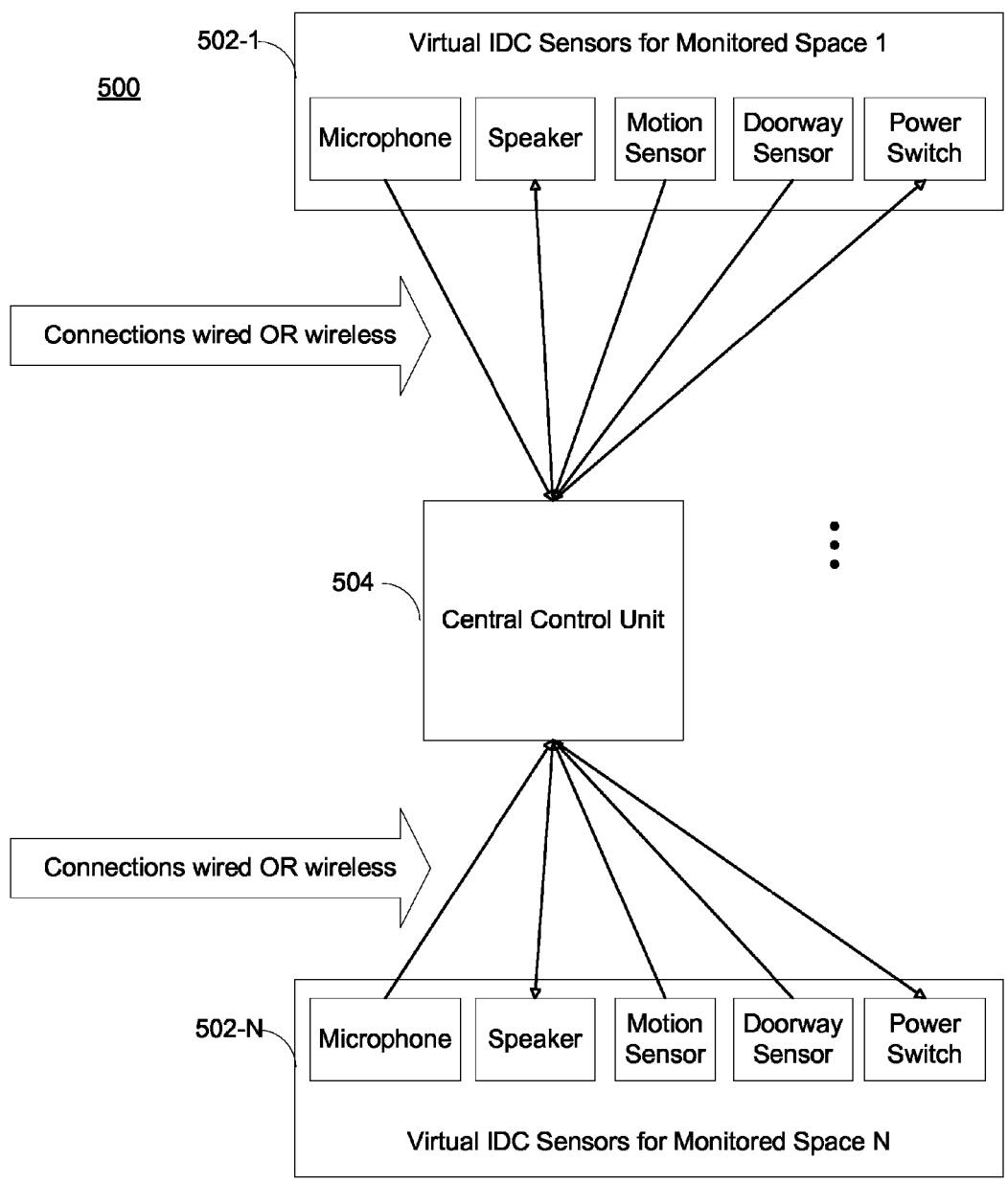
FIG. 5 is a block diagram illustrating a system of embodiments of the invention in a distributed manner according to an embodiment of the invention.

A wide variety of home automation systems as well as commercial building automation systems exist to provide automated control of lighting throughout all or part of a home or building. The ideas embodied within the IDC as described above can be incorporated into an automation system's central controller so that one controller can implement the IDC logic for multiple, independent lighting environments controlled by the common automation controller. The control for each independent lighting environment is herein referred to as a Virtual IDC (as illustrated in FIG. 5). For example, the virtual IDC includes a system 500 having virtual IDC sensors for monitored space 1 502-1 to virtual IDC sensors for monitored space N 502-N. A central control unit 504 controls and/or manages 502-1 to 502-N according to embodiments of the invention described above. In one embodiment, the IDC or the virtual IDC outputs information gathered or received from the sensors and information transmitted to the controlled device for further processing, such as monitoring, tracking or the like of the monitored space or energy use of the controlled device. It is to be understood that additional capabilities and functionality arise from this approach without departing from the scope of the invention.

With an automation system, the constituent parts of the IDC as described in prior embodiments can easily be geographically dispersed or separated relative to one-another. The control for multiple lighting subsystems can reside in a common controller. The sensors can be housed within a wall switch as before, within a surface mounted enclosure, or they can be in one or more separate enclosures. Multiple sensors can be used to augment the control of one controlled device. As an example, for an irregularly shaped monitored space it could be beneficial to have multiple motion sensors within that monitored space. The controller could treat the information from all the sensors as if they were one. Practical examples of this approach include a floor of a library with sensors placed between the rows, a large warehouse floor, a parking lot or a parking garage where a single sensor (motion or microphone) cannot cover the entire monitored space. Another application of a geographically separated sensor might be a remote wireless microphone by the toilet stalls in a public bathroom. In this way the sensitivity of the microphone to the anticipated Control noise source could be enhanced and the microphone might be further removed from the door and therefore less sensitive to ambient noise from outside the monitored space (the public rest room.)

Note that the state of each Virtual IDC can be known to the automation system. In this way, for example, the automation system can know which rooms are occupied. If a Virtual IDC is in the room occupied state and the associated controlled light is off, the automation controller can reasonably assume that the room occupant is in bed asleep. This has implications for safety and monitoring of the elderly and disabled.

Figure 6:
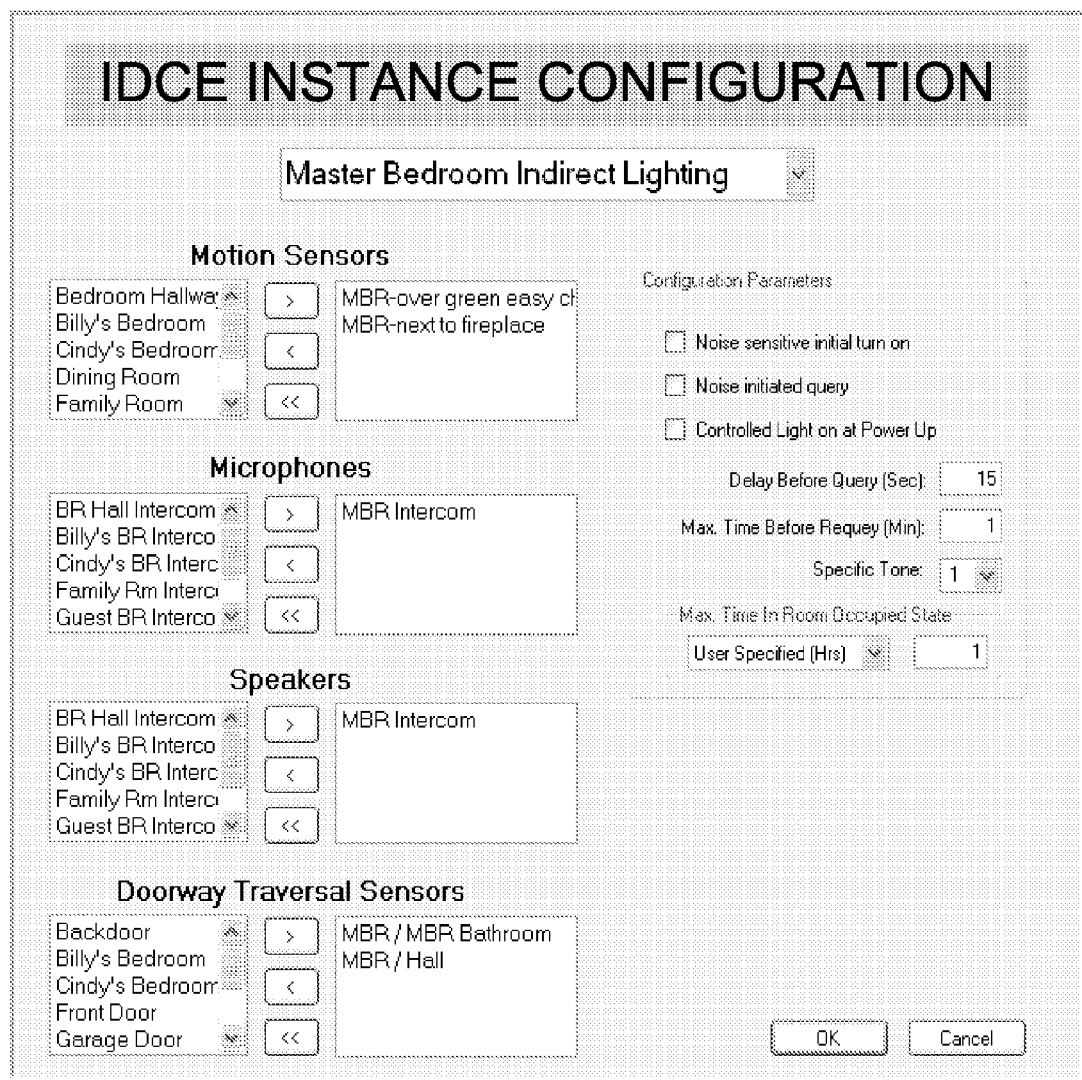
FIG. 6 is a screen shot illustrating a user configuration interface for configuring the system in FIG. 5 according to an embodiment of the invention.

A distributed controller incorporating the Virtual IDC technology requires a configuration or setup screen to configure each instance of a Virtual IDC. An example of such a configuration screen is shown in FIG. 6. The top drop-down box (in this example containing "Master Bedroom Ceiling Light") offers the user a drop down list of all available controlled lights (and associated monitored spaces.) For each Virtual IDC, there are four lists providing the user with the ability to select the associated motion sensor(s), microphone(s), speaker(s) and Doorway Traversal Sensor(s). For each of these four parameters, there is a list (on the left) of available devices to choose from and a list on the right containing the user's choices for the currently selected Virtual IDC instance. In the example of FIG. 6, the user has configured the Master Bedroom Virtual IDC to be sensitive to two motion sensors; it will use the MBR intercom for the microphone, the MBR intercom for the speaker, and will be sensitive to Doorway Traversal Sensors—one for the doorway between the MBR and MBR bathroom and the other for the doorway between the MBR and the adjoining hall. Note that the IDC configuration jumper setting for the "Doorway Traversal Sensor Connected" can be inferred from the number of sensors selected in the configuration. If there are no sensors selected then the value for the "Doorway Traversal Sensor Connected" parameter is false and true otherwise.

Additional Features and Embodiments

1. An alternative embodiment enhances at least some of the existing technologies with the addition of an IDC dimming circuit which would begin dimming the light after the momentary off-on sequence to alert the room occupant that the controlled light will go off after a query response Period unless the room occupant takes action to make his/her presence known. If the IDC does not detect the room occupant's presence, the controlled light will dim to off and remain off and the IDC will return to the Room Unoccupied state.

2. In environments where there is little ambient acoustical noise, the IDC can be sensitive to Control noise in the same way it is sensitive to motion. In one embodiment, all discussions of "motion" may be extended to include the detection of acoustical noise above some minimum threshold (i.e. Control noise) in addition to actual motion. An IDC configured in this way could include configuration options to reduce undesirable or unintended response to ambient noise. These options could include:

a. NoiseSameAsMotion—when this option is chosen, the IDC interprets acoustical noise in the same way it interprets Detected Motion. b.

NoiseSensitiveInitialTurnON—when this option is chosen, the IDC will turn on the controlled light upon detecting any ambient noise provided the amplitude, energy and/or duration is above some preset minimum. If this option is not chosen then the IDC will be insensitive to ambient noise when the controlled light is off.

c. NoiseSensitiveQuery—when this option is chosen, any ambient noise is treated by the IDC the same as if the IDC detected a Specific Tone while the IDC is in either the room occupied state or Room May Be Occupied State.

3. A potential problem with the room occupant using a Specific Tone to control the IDC in an environment where there are multiple and distinct monitored space's is that the IDC or the virtual IDC for one monitored space might misinterpret a Specific Tone intended for an adjacent monitored space. This potential problem can be mitigated by designing the IDC to be sensitive to multiple Specific Tones with an individual Specific Tone selectable via a user configuration. With this ability of the IDC, IDCs in adjacent monitored spaces can be configured to be sensitive to different Specific Tones. Practically speaking, this might be achieved by the IDC being packaged for retail sale with multiple whistles of different colors representing different and unique Specific Tone's.

4. A Specific Tone can be defined to be a noise meeting the following characteristics: a) duration greater than some preset minimum (e.g. greater than two seconds) AND b) Average energy (amplitude) greater than a preset minimum AND c) a relatively constant frequency spectrum. An example noise that meets these characteristics is a human whistle.

For these illustrated purposes only and not by limitation, "a relatively constant frequency spectrum" means a spectrum where the amplitude peaks have a quasi-constant relationship to one another in both relative frequency and relative amplitude.

A human whistle is not a pure (single frequency) sound. It is a combination of frequencies having a "signature" that is unique to each individual. Even though the absolute characteristics of a human whistle will vary between individuals and from time to time for a particular individual, any human should be able to generate a whistle meeting the above characteristics. A random noise would be unlikely to meet these criteria.

5. An example of commonly occurring ambient noise that might be misinterpreted as a Control noise is thunder. Another example might be a siren from an emergency vehicle passing by. The affect of these spurious noises can be mitigated in a house or building automation system by designing the control system to detect when multiple, geographically dispersed microphones detect a noise concurrently. Such detected events can be ignored by the controller.

6. The idea embodied in the IDC of querying a user before an automated controller takes some action is applicable to other environments than lighting control. Other examples include:

a. An automated gate to restrict the flow of traffic. The gate controller can be designed so that, when it is about to close the gate, it first initiates a query sequence to inform the driver that the gate is about to close and to provide an opportunity (e.g. by honking the vehicle horn) for the driver to prevent the closure.

b. An automated garage door

7. Other devices which sense the presence of a person in the room and control a device based on this detected presence can take advantage of the ideas embodied herein. An example of such a device is the Sensor Plug "motion activated electrical outlet."

8. An intercom system integrated into an automation system could provide the microphone sensor required by the IDC logic. Further a sophisticated automation system could use an integrated intercom system to broadcast in the monitored space spoken phrases like "light will turn off in ten seconds. Make a loud noise to keep light on."

9. The combination of Doorway Traversal Sensor and motion sensor makes it possible to know with certainty that someone is in the monitored space without an overt interaction with the room occupant (via a query sequence or detection of Specific Tone). This is true because motion with the monitored space is proof of a room occupant at the time the motion is detected. Subsequently, the room occupant cannot leave the monitored space without causing a Doorway Traversal event. This idea has application in security systems as well as lighting control.

10. A Doorway Traversal Sensor can be made pet immune by having two sensors in a doorway; one close to the floor so it will trigger when a pet passes through the doorway and a second one high enough so that it will not trigger when a pet passes through. A person can then be distinguished from a pet by observing whether just one Doorway Traversal Sensor generates an event (i.e. the lower one) thus indicating a pet vs. both Doorway Traversal Sensors generating events thus indicating a person has passed through the doorway.

11. A sequence of a) Detected Motion in monitored space A, b) Doorway Traversal through doorway that joins monitored space A and monitored space B, and c) Detected Motion in monitored space B has a high probability of being due to an individual moving from monitored space A to monitored space B. The logic to implement this occupant tracking can be incorporated into a distributed controller which contains knowledge of the current state of all the Virtual IDC's maintained by the controller, which is illustrated in FIG. 5.

12. A Doorway Traversal that follows the most recent Detected Motion by more than a few seconds is most likely someone entering the monitored space.

13. Use of a Radio Frequency Identification Device (RFID) reader as a Doorway Traversal Sensor can not only allow the control system to know who is passing through a doorway but also removes the ambiguity of whether a person is entering or leaving a monitored space. This is true because the control system will always know which room each person is currently in and the rooms on either side of the doorway. (If a room occupant is known to be in room A and passes through the doorway between room A and room B then she must have entered room B since the control system knows she was in room A before the traversal.)

14. A Specific Tone can be generated and "played" by a desktop, laptop or bedside computer. This provides easy control of the IDC (and the controlled device) from a bedside computer for example. The idea of the Specific Tone could be expanded to a set of discernable tones with one tone being for "light on" and another for "light off."

15. If a speaker or enunciator is available, the IDC can provide audible feedback to the room occupant. For example when the IDC recognized a query response the IDC could generate a short beep or tone as acknowledgement.

16. Alternative embodiments of the invention may also expose or provide occupant information or other information to other devices or systems such that the provided or exposed information may further be processed. For example, embodiments of the invention may, based on Embodiment 1, provide a monitored space's occupant information (i.e., whether an individual is likely present or absent in the monitored space) to a security or alarm system to monitor the presence or absence of the individual.

In one embodiment, a method, an apparatus, or a system may implement at least a portion of aspects of the invention disclosed in FIG. 4 and described above. For example, a method may define a plurality of states of the controller (e.g., controller 200) controlling a controlled device associated with the monitored space (e.g., monitored space 308). At an initial state (i.e., Room Unoccupied State 0 and Start state in FIG. 4), an event indicating a possible presence of a subject within the monitored space is received. The controller 200 changes from the initial state in which the controlled device is de-energized to a first state (e.g., Room May Be Occupied State 1 in FIG. 4) in which the controlled device is energized in the first state and in response to the received event. The first state indicates that the subject may be in the monitored space. While in the first state, an event timer (i.e., delay before query) is initiated and set to expire after a first delay (e.g., in seconds). The controller remains in the first state in response to receiving a signal indicating a detection of additional events before the expiration of the event timer.

In one example, the additional events include at least one of the following: a motion signal, a user generated signal, and a passageway signal, said passageway signal being generated from a passageway traversal sensor connected to the controller. The user generated signal includes at least one of the following: wireless transmission signal, infrared signal, a noise, a sequence of noises, and a specific tone. The issued challenge comprises an audio challenge or a visual challenge. In another embodiment, an occupied flag (i.e., room occupied flag) has at least one of the following characteristics: the occupied flag is set at any time when the controller enters a third state (e.g., Room Occupied State (4)), the occupied flag is cleared at any time the controller enters the first state, the occupied flag is set while changing from the first state to a second state (e.g., Query Occupant state (2) and Wait for acknowledgement state (3) in FIG. 4) in response to receiving the user generated signal. In another embodiment, the controller 200 changes to the third state from the second state and the controlled device de-energizes while in the second state and upon an expiration of the query response timer without receiving the query response and with the occupied flag set.

In a further example, upon expiration of the event timer, the controller changes from the first state to the second state. While in the second state: the processor may initiate a query response timer (e.g., query response period) set to expire after a second time delay. A query challenge is issued before the expiration of the query response timer.

In one embodiment, the issued challenge may be an audio challenge (e.g., "Are you still there? Please respond by uttering a voice or waving your hands.") or a visual challenge (e.g., directing a light beam at a particular location which can easily detect the presence of the subject). In an alternative embodiment, the challenge may be subtle or not noticeable to the user. For example, the challenge may involve activating a sensor that detects or senses the weight of the subject at a particular location. Alternatively, the challenge may be an acoustic wave at a wavelength that may be undetected by the subject but can detect the presence/absence of the subject in the monitored space. Responsive to the issued query challenge, a query response signal is received. For example, the query response signal may result from a signal indicating a detection of the subject's action or inaction. In the example of the subtle challenge, the mere fact of the user's weight at a certain location can be treated as a query response.

In response to the query response, the controller 202 may change from the second state to the first state and the event timer is reset when the query response signal indicates the subject may still provisionally be in the monitored space. In one embodiment, responsive to the query challenge, the processor changes from the second state to the initial state in which the controlled device is de-energized when the query response signal fails to indicate the subject responded to the query challenge.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Appendix A includes source codes for implementing an exemplary embodiment of the IDC Finite State Machine according to an embodiment of the invention.

using System;

using System.Collections.Generic;

using System.Text;

using System.Diagnostics;

```
//DSA, Inc. Proprietary and Confidential. All rights reserved. © DSA, Inc.
//CONFIDENTIALITY NOTICE: This document contains privileged and confidential
//information and is intended only for the use of the specific individual(s) to
//whom it has been delivered directly by authorized representatives of DSA, Inc.. If you
// are not an intended recipient of this document, you are hereby notified that any
//unauthorized use, dissemination or copying of
//this document or the information contained in it or attached to it is
//strictly prohibited.
namespace Lighting_Controller
{
   internal static class LC_FSM
   {
      private static enuFSMStates _currentState = enuFSMStates.efsms0;
      private static enuFSMStates _previousState = enuFSMStates.efsms0;
      private static frmLC _ui;
      private static string _arc = "xxx";
      private static bool _bROF = false;
      private const bool _bControlledLightOnAtPowerUp = false;
      internal enum enuFSMStates
      {
         efsms0, efsms1, efsms2, efsms3, efsms4, efsms5
      }
      internal enum enuDelayPeriods{edp1, edp2, edp3}
      internal enum enuTimingUnits{etuHundredsOfMilliseconds,
      etuSeconds}
      internal static frmLC UI
   {
      get { return LC_FSM._ui; }
      set { LC_FSM._ui = value; }
   }
   internal static bool ROF
   {
      get {return LC_FSM._bROF;}
      set{ LC_FSM._bROF = value; }
   }
   private static string Arc
   {
      get { return LC_FSM._arc; }
      set{LC_FSM._arc = value;}
   }
   internal static enuFSMStates CurrentState
   {
      get { return _currentState; }
      set
      {
         _previousState = _currentState;
         if (value != _currentState)
         {
            _currentState = value;
         }
         UI.CurrentEvent = frmLC.enuEvent.eeNone;
      }
   }
   static LC_FSM( ) { }
   internal static bool AdvanceStateMachine( )
   {
      enuFSMStates nextState;
      bool bMoreToDo;
      switch (CurrentState)
      {
   case enuFSMStates.efsms0:
      Arc = "X";
      if (_bControlledLightOnAtPowerUp)
         nextState = enuFSMStates.efsms2;
      else
         nextState = enuFSMStates.efsms1;
      break;
   case enuFSMStates.efsms1:
      if (CurrentState != _previousState)
      {
         UI.TimerEnabled = false;
         UI.CurrentLightState = frmLC.enuLightStates.elsOff;
         UI.ConfigurationJumperCheckBoxesEnabled = true;
      }
```

-continued

```
   UI.ValidateMaxTimerParameters( );
   if ((UI.MaxTimerState != frmLC.enuMaxTimerStates.emtsDisabled) && (
      (UI.CurrentEvent == frmLC.enuEvent.eeSpecificTone) ||
      (UI.CurrentEvent == frmLC.enuEvent.eeMotion &&
      UI.DoorTraversalSensorConnected)))
   {
      Arc = "X";
      nextState = enuFSMStates.efsms5;
   }
   else if (
     (UI.CurrentEvent == frmLC.enuEvent.eeMotion) ||
     (UI.CurrentEvent == frmLC.enuEvent.eeDoorTraversal) ||
     ((UI.CurrentEvent == frmLC.enuEvent.eeNoise) &&
       UI.NoiseSensitiveInitialTurnOn))
   {
      Arc = "X";
      nextState = enuFSMStates.efsms2;
   }
   else nextState = CurrentState;
   if (nextState != enuFSMStates.efsms1)
   {
      UI.ConfigurationJumperCheckBoxesEnabled = false;
   }
   break;
case enuFSMStates.efsms2:
   if (CurrentState != _previousState)
   {
      UI.SetTimeoutValue(enuDelayPeriods.edp1);
      UI.CurrentLightState = frmLC.enuLightStates.elsOn;
      ROF = false;
   }
   if (UI.CurrentEvent == frmLC.enuEvent.eeSpecificTone)
   {
      Arc = "X";
      ROF = true;
      nextState = enuFSMStates.efsms3;
   }
   else if ((UI.CurrentEvent == frmLC.enuEvent.eeNoise))
   {
      if (UI.NoiseInitiatedQuery)
      {
         Arc = "X";
         ROF = true;
         nextState = enuFSMStates.efsms3;
      }
      else
      {
         Arc = "X";
         UI.SetTimeoutValue(enuDelayPeriods.edp1);
         nextState = enuFSMStates.efsms2;
      }
   }
   else if (
     ((UI.CurrentEvent == frmLC.enuEvent.eeMotion) &&
     (!UI.DoorTraversalSensorConnected ||
     (UI.MaxTimerState == frmLC.enuMaxTimerStates.emtsDisabled))) ||
     (UI.CurrentEvent == frmLC.enuEvent.eeDoorTraversal))
   {
      Arc = "X";
      UI.SetTimeoutValue(enuDelayPeriods.edp1);
      nextState = enuFSMStates.efsms2;
   }
   else if (UI.TimeOutTimeRemaining <= 0)
   {
      Arc = "X";
      nextState = enuFSMStates.efsms3;
   }
   else if (UI.DoorTraversalSensorConnected &&
     (UI.CurrentEvent == frmLC.enuEvent.eeMotion) &&
     (UI.MaxTimerState != frmLC.enuMaxTimerStates.emtsDisabled))
   {
      Arc = "X";
      nextState = enuFSMStates.efsms5;
   }
```

```
        else nextState = CurrentState;
      break;
  case enuFSMStates.efsms3:
      if (CurrentState != _previousState)
      {
        UI.SetTimeoutValue(enuDelayPeriods.edp2);
        UI.CurrentLightState = frmLC.enuLightStates.elsOff;
      }
      if (UI.TimeOutTimeRemaining <= 0)
      {
        Arc = "X";
        nextState = enuFSMStates.efsms4;
      }
      else nextState = CurrentState;
      break;
  case enuFSMStates.efsms4:
      if (CurrentState != _previousState)
      {
        UI.SetTimeoutValue(enuDelayPeriods.edp3);
        UI.CurrentLightState = frmLC.enuLightStates.elsDimming;
      }
      if ((UI.MaxTimerState != frmLC.enuMaxTimerStates.emtsDisabled) && (
        (UI.CurrentEvent == frmLC.enuEvent.eeSpecificTone) ||
        (UI.CurrentEvent == frmLC.enuEvent.eeNoise)))
      {
        Arc = "X";
        UI.CurrentLightState = frmLC.enuLightStates.elsOn;
        nextState = enuFSMStates.efsms5;
      }
      else if (
        (UI.CurrentEvent == frmLC.enuEvent.eeMotion) &&
        !UI.DoorTraversalSensorConnected)
      {
        Arc = "X";
        nextState = enuFSMStates.efsms2;
      }
      else if ((UI.MaxTimerState == frmLC.enuMaxTimerStates.emtsDisabled) && (
        (UI.CurrentEvent == frmLC.enuEvent.eeSpecificTone) ||
        (UI.CurrentEvent == frmLC.enuEvent.eeNoise)))
      {
        Arc = "X";
        nextState = enuFSMStates.efsms2;
      }
      else if (UI.CurrentEvent == frmLC.enuEvent.eeDoorTraversal)
      {
        Arc = "X";
        nextState = enuFSMStates.efsms2;
      }
      else if (UI.TimeOutTimeRemaining <= 0)
      {
        if (ROF == false)
        {
          //noone known to be in the room
          Arc = "X";
          nextState = enuFSMStates.efsms1;
        }
        else
        {
          Arc = "U";
          UI.CurrentLightState = frmLC.enuLightStates.elsOff;
          nextState = enuFSMStates.efsms5;
        }
      }
      else nextState = CurrentState;
      break;
  case enuFSMStates.efsms5:
      if (CurrentState != _previousState)
      {
        UI.TimerEnabled = false;
        if (
          (UI.MaxTimerState != frmLC.enuMaxTimerStates.emtsDisabled) &&
          (UI.MaxTimerState != frmLC.enuMaxTimerStates.emtsNoLimit))
        {
```

```
        UI.MaxTimerState = frmLC.enuMaxTimerStates.emtsActive;
      }
      if (Arc != "U")
      {
        UI.CurrentLightState = frmLC.enuLightStates.elsOn;
        ROF = true;
      }
    }//if (CurrentState != _previousState)
    else
    {
    }// if (CurrentState != _previousState)
    if (UI.CurrentEvent == frmLC.enuEvent.eeDoorTraversal)
    {
       Arc = "X";
       nextState = enuFSMStates.efsms2;
    }//if (UI.CurrentEvent == frmLC.enuEvent.eeDoorTraversal)
    else if ((UI.CurrentEvent == frmLC.enuEvent.eeMotion) &&
       !(UI.DoorTraversalSensorConnected))
    {
       Arc = "X";
       nextState = enuFSMStates.efsms2;
    }// if ((UI.CurrentEvent == frmLC.enuEvent.eeMotion) && ...
    else if ((UI.CurrentLightState == frmLC.enuLightStates.elsOn) &&
      ((UI.CurrentEvent == frmLC.enuEvent.eeSpecificTone) ||
      ((UI.CurrentEvent == frmLC.enuEvent.eeNoise) &&
       UI.NoiseInitiatedQuery)))
    {
       Arc = "X";
       nextState = enuFSMStates.efsms3;
    }
    else if ((UI.CurrentLightState == frmLC.enuLightStates.elsOff) &&
      ((UI.CurrentEvent == frmLC.enuEvent.eeSpecificTone) ||
      ((UI.CurrentEvent == frmLC.enuEvent.eeNoise) &&
       UI.NoiseSensitiveInitialTurnOn)))
    {
       Arc = "X";
       UI.CurrentLightState = frmLC.enuLightStates.elsOn;
       nextState = CurrentState;
    }
    else if (UI.CurrentEvent == frmLC.enuEvent.eeMaxTimerExpired){
       Arc = "X";
       LC_FSM.ROF = false;
       nextState = enuFSMStates.efsms3;
       }
       else nextState = CurrentState;
       if (nextState != enuFSMStates.efsms5){
         if (
         (UI.MaxTimerState != frmLC.enuMaxTimerStates.emtsDisabled) &&
         (UI.MaxTimerState != frmLC.enuMaxTimerStates.emtsNoLimit)) {
            UI.MaxTimerState = frmLC.enuMaxTimerStates.emtsInactive;
         }
       }
       break;
    default:
      nextState = enuFSMStates.efsms1;
      break;
      }//end switch( CurrentState)
    bMoreToDo = (CurrentState != nextState);
    CurrentState = nextState;
    return bMoreToDo;
  }//end AdvanceStateMachine( )
}//end class LC_FSM
}
```

What is claimed is:

1. A method for a controller to control devices associated with a monitored space, said method comprising:

defining a plurality of states of the controller controlling a controlled device associated with the monitored space;

at an initial state, receiving an event indicating a possible presence of a subject within the monitored space;

changing from the initial state in which the controlled device is de-energized to a first state in which the controlled device is energized in the first state and in response to the received event, said first state indicating that the subject can provisionally be in the monitored space;

while in the first state:
  initiating an event timer set to expire after a first delay;
  resetting the event timer in response to receiving a signal indicating a detection one or more additional events before the expiration of the event timer thereby remaining in the first state;

upon expiration of the event timer, changing from the first state to a second state;

while in the second state:
 issuing a query challenge;
 responsive to the issued query challenge, detecting a query response signal;
 responsive to the query challenge, changing from the second state to the first state and resetting the event timer when the query response signal indicates the subject may still provisionally be in the monitored space; and
 responsive to the query challenge, changing from the second state to the initial state in which the controlled device is de-energized when the query response signal fails to indicate the subject responded to the query challenge.

2. The method of claim 1, wherein the events or the additional events comprises at least one of the following: a motion signal, a user generated signal, and a passageway signal, said passageway signal being generated from a passageway traversal sensor connected to the controller, sad user generated signal includes at least one of the following: wireless transmission signal, infrared signal, a noise, a sequence of noises, a human whistle, and a specific tone, and wherein the issued challenge comprises an audio challenge or a visual challenge, and further comprising an OccupiedFlag, said OccupiedFlag having at least one of the following characteristics: the occupied flag being set at any time when the controller enters a third state; the occupied flag being cleared at any time the controller enters the first state; the OccupiedFlag is set while changing from the first state to the second state in response to receiving the user generated signal, and, changing to the third state from the second state and de-energizing the controlled device while in the second state and upon an expiration of the query response timer without receiving the query response and with the OccupiedFlag set.

3. The method of claim 2, further comprising changing from the second state to the third state in response to the query response, wherein the query response includes the user generated signal, said third state indicating the subject wishes to remain in the monitored space with the controlled device remaining energized, wherein the third state sets an OccupiedFlag, and wherein the event timer is disabled.

4. The method of claim 2, at the initial state, further comprising changing from the initial state to the third state after receiving the user generated signal or after receiving the motion signal event with the passageway traversal sensor connected to the controller, wherein the controlled device is energized, wherein a combination of the received motion signal event with the passageway traversal sensor connected to the controller provides a certainty that the subject is in the monitored space.

5. The method of claim 2, further comprising, while in the third state, energizing the controlled device in response to receiving the user generated signal.

6. The method of claim 2, further comprising changing from the third state to the second state in response to receiving another user generated signal.

7. The method of claim 2, while in the third state, further comprising changing to the first state in response to receiving the motion signal without the passageway traversal sensor connected or in response to receiving the passageway signal.

8. The method of claim 2, further comprising changing from the first state to the third state in response to receiving the motion signal while the passageway traversal sensor is connected to the controller.

9. The method of claim 1, further comprising changing from the second state to the first state in response to receiving one or more of the following query response signal: the motion signal, with the passageway traversal sensor disconnected;
 the user generated signal; and
 the passageway signal.

10. The method of claim 1, further comprising ignoring the received event if the received event is received by a plurality of sensors simultaneously or substantially simultaneously.

11. The method of claim 1, further comprising, while in the second state, initiating a query response timer set to expire after a second delay, and wherein issuing the query challenge comprises issuing the query challenge before the expiration of the query response timer.

12. An apparatus comprising:
 at least one sensor for generating an event signal indicating a possible presence of a subject within a monitored space;
 an output device for sending a signal to energize or de-energize a controlled device;
 a processor configured to enable the apparatus in a plurality of states, including an initial state, a first state, a second state, and a third state:
  changing from the initial state in which the controlled device is de-energized to a first state in which the controlled device is energized in the first state and in response to the received event, said first state indicating that the subject may be in the monitored space;
 while in the first state:
  initiating an event timer set to expire after a pre-determined duration;
  remaining in the first state in response to receiving a signal indicating a detection of additional events before the expiration of the event timer, said the remaining further resetting the event timer; and
  upon expiration of the event timer, changing from the first state to a second state;
 while in the second state:
  issuing a query challenge;
  responsive to the issued query challenge, detecting a query response signal;
  responsive to the query challenge, changing from the second state to the first state and resetting the event timer when the query response signal indicates the subject may still provisionally be in the monitored space; and
 responsive to the query challenge, changing from the second state to the initial state in which the controlled device is de-energized when the query response signal fails to indicate the subject responded to the query challenge.

13. The apparatus of claim 12, wherein the events or the additional events comprises at least one of the following: a motion signal, a user generated signal, and a passageway signal, said passageway signal being generated from a passageway traversal sensor connected to the controller, sad user generated signal includes at least one of the following: wireless transmission signal, infrared signal, a noise, a sequence of noises, and a specific tone, and wherein the issued challenge comprises an audio challenge or a visual challenge, and further comprising an OccupiedFlag, said OccupiedFlag having at least one of the following characteristics: the OccupiedFlag being set at any time when the controller enters a third state; the OccupiedFlag being cleared at any time the controller enters the first state; the OccupiedFlag is set while the processor changes from the first state to the second state in response to receiving the user generated signal, and, the processor changes to the third state from the second state and de-energizing the controlled device while in the second state and upon an expiration of the query response timer without receiving the query response and with the OccupiedFlag set.

14. The apparatus of claim 13, wherein the processor further changes from the second state to the third state in response to the query response, wherein the query response includes the user generated signal, said third state indicating the subject wishes to remain in the monitored space with the controlled device remains energized, wherein the third state sets an OccupiedFlag, and wherein the event timer is disabled.

15. The apparatus of claim 13, at the initial state, wherein the processor further changes from the initial state to the third state after receiving the user generated signal or after receiving the motion signal event with the passageway traversal sensor connected to the controller, wherein the controlled device is energized.

16. The apparatus of claim 13, wherein the controlled device, while in the third state, is energized in response to receiving the user generated signal.

17. The apparatus of claim 13, wherein the processor further changes from the third state to the second state in response to receiving another user generated signal.

18. The apparatus of claim 13, while in the third state, wherein the processor further changes to the first state in response to receiving the motion signal without the passageway traversal sensor connected or in response to receiving the passageway signal.

19. The apparatus of claim 13, wherein the processor further changes from the first state to the third state in response to receiving the motion signal while the passageway traversal sensor is connected to the controller.

20. The apparatus of claim 12, wherein the processor further changes from the second state to the first state in response to receiving one or more of the following query response signal:
   the motion signal, with the passageway traversal sensor disconnected;
   the user generated signal; and
   the passageway signal.

21. The apparatus of claim 12, wherein the processor further ignores the received event if the received event is received by a plurality of sensors simultaneously or substantially simultaneously.

22. The apparatus of claim 12, while in the second state, wherein the processor further initiates a query response timer set to expire after a second delay, and wherein issuing the query challenge comprises issuing the query challenge before the expiration of the query response timer.

23. A system comprising:
   a controlled device;
   at least one sensor for receiving an event signal indicating a possible presence of a subject within a monitored space, said at least one sensor including a passageway traversal sensor for receiving a passage signal indicating the subject traversing a passageway to the monitored space, said at least one sensor transmits the received event signal to a processor;
   a switch, being connected with the controlled device, for energizing or de-energizing the controlled device;
   wherein the processor, being connected to the at least one sensor and the switch, is configured to enable the system transitioning between a plurality of states, said plurality of states including: an initial state, a first state, a second state, and a third state:
      changing from the initial state in which the switch de-energized the controlled device to a first state in which the switch energizes the controlled device in the first state and in response to the received event from the at least one sensor or the passageway signal from the passageway traversal sensor, said first state indicating that the subject may be in the monitored space;
   while in the first state:
      initiating an event timer set to expire after a pre-determined duration;
      remaining in the first state in response to receiving another signal from the at least one sensor or another passageway signal, said the remaining further resetting the event timer; and
      upon expiration of the event timer, changing from the first state to a second state;
   while in the second state:
      issuing a query challenge;
      responsive to the issued query challenge, detecting a query response signal;
      responsive to the query challenge, changing from the second state to the first state and resetting the event timer when the query response signal indicates the subject may still provisionally be in the monitored space; and
      responsive to the query challenge, changing from the second state to the initial state in which the controlled device is de-energized when the query response signal fails to indicate the subject responded to the query challenge.

24. The system of claim 23, wherein the events or the additional events comprises at least one of the following: a motion signal, a user generated signal, and a passageway signal, said passageway signal being generated from a passageway traversal sensor connected to the controller, sad user generated signal includes at least one of the following: wireless transmission signal, infrared signal, a noise, a sequence of noises, and a specific tone, and wherein the issued challenge comprises an audio challenge or a visual challenge, and further comprising an OccupiedFlag, said OccupiedFlag having at least one of the following characteristics: the OccupiedFlag being set at any time when the controller enters a third state; the OccupiedFlag being cleared at any time the controller enters the first state; the OccupiedFlag is set while the processor changes from the first state to the second state in response to receiving the user generated signal, and, the processor changes to the third state from the second state and de-energizing the controlled device while in the second state and upon an expiration of the query response timer without receiving the query response and with the OccupiedFlag set.

25. The system of claim 24, wherein the processor further changes from the second state to the third state in response to the query response, wherein the query response includes the user generated signal, said third state indicating the subject wishes to remain in the monitored space with the controlled device remains energized, wherein the third state sets an OccupiedFlag, and wherein the event timer is disabled.

26. The system of claim 24, at the initial state, wherein the processor further changes from the initial state to the third state after receiving the user generated signal or after receiving the motion signal event with the passageway traversal sensor connected to the controller, wherein the controlled device is energized.

27. The system of claim 24, wherein the controlled device, while in the third state, is energized in response to receiving the user generated signal.

28. The system of claim 24, wherein the processor further changes from the third state to the second state in response to receiving another user generated signal.

29. The system of claim 24, while in the third state, wherein the processor further changes to the first state in response to receiving the motion signal without the passageway traversal sensor connected or in response to receiving the passageway signal.

30. The system of claim 24, wherein the processor further changes from the first state to the third state in response to receiving the motion signal while the passageway traversal sensor is connected to the controller.

31. The system of claim 23, wherein the processor further changes from the second state to the first state in response to receiving one or more of the following query response signal:

the motion signal, with the passageway traversal sensor disconnected;

the user generated signal; and the passageway signal.

32. The system of claim 23, wherein the processor further outputs at least the following information of the system: a state of the controlled device, the states of the system, a state of the at least one sensor, and one or more paths showing the transitions of the system between the plurality of states.

33. The system of claim 23, wherein the processor further ignores the received event if the received event is received by a plurality of sensors simultaneously or substantially simultaneously.

34. The system of claim 23, while in the second state, wherein the processor further initiates a query response timer set to expire after a second delay, and wherein issuing the query challenge comprises issuing the query challenge before the expiration of the query response timer.

35. A method for managing energy use associated with a monitored space, said method comprising:

defining a plurality of states of the controller controlling a controlled device associated with the monitored space;

at an initial state, receiving an event indicating a possible presence of a subject within the monitored space;

changing from the initial state in which the controlled device is de-energized to a first state in which the controlled device is energized in the first state and in response to the received event, said first state indicating that the subject can provisionally be in the monitored space;

while in the first state:
  initiating an event timer set to expire after a first delay;
  resetting the event timer in response to receiving a signal indicating a detection one or more additional events before the expiration of the event timer thereby remaining in the first state;

upon expiration of the event timer, changing from the first state to a second state;

while in the second state:
  issuing a query challenge;
  responsive to the issued query challenge, detecting a query response signal;
  responsive to the query challenge, changing from the second state to the first state and resetting the event timer when the query response signal indicates the subject may still provisionally be in the monitored space; and responsive to the query challenge, changing from the second state to the initial state in which the controlled device is de-energized when the query response signal fails to indicate the subject responded to the query challenge.

* * * * *